US010444406B2

United States Patent
Sun et al.

(10) Patent No.: US 10,444,406 B2
(45) Date of Patent: Oct. 15, 2019

(54) SHORT TERM CLOUD COVERAGE PREDICTION USING GROUND-BASED ALL SKY IMAGING

(71) Applicant: Siemens Aktiengesellschaft, Munich (DE)

(72) Inventors: Shanhui Sun, Plainsboro, NJ (US); Jan Ernst, Plainsboro, NJ (US); Archana Sapkota, Colorado Springs, CO (US); Eberhard Ritzhaupt-Kleissl, Baiersdorf (DE); Jeremy Ralph Wiles, Nuremberg (DE); Terrence Chen, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 653 days.

(21) Appl. No.: 14/255,154

(22) Filed: Apr. 17, 2014

(65) Prior Publication Data

US 2015/0301226 A1    Oct. 22, 2015

(51) Int. Cl.
   *G01W 1/10* (2006.01)
   *G01J 1/42* (2006.01)
   *G01W 1/12* (2006.01)

(52) U.S. Cl.
   CPC ............ *G01W 1/10* (2013.01); *G01J 1/4204* (2013.01); *G01W 1/12* (2013.01)

(58) Field of Classification Search
   None
   See application file for complete search history.

(56) References Cited

U.S. PATENT DOCUMENTS

| 2004/0162677 A1* | 8/2004 | Bednar | G01V 1/28 702/14 |
| 2010/0198420 A1* | 8/2010 | Rettger | G01W 1/10 700/291 |
| 2010/0309330 A1* | 12/2010 | Beck | G01W 1/10 348/222.1 |

(Continued)

FOREIGN PATENT DOCUMENTS

EP    3645135 A1    10/2013

OTHER PUBLICATIONS

Gonzalex et al., Cloud Nowcasting: Motion Analysis of All-Sky Images Using Velocity Fields, Jul. 18-19, 2013, 19th Symposium IMEKO TC 4 Symposium and 17th IWADC Workshop, pp. 203-207 (Year: 2013).*

(Continued)

*Primary Examiner* — Sujoy K Kundu
*Assistant Examiner* — Brent A. Fairbanks

(57) ABSTRACT

A method for predicting short-term cloud coverage includes a computer calculating an estimated cloud velocity field at a current time value based on sky images. The computer determines a segmented cloud model based on the sky images, a future sun location corresponding to a future time value, and sun pixel locations at the future time value based on the future sun location. Next, the computer applies a back-propagation algorithm to the sun pixel locations using the estimated cloud velocity field to yield propagated sun pixel locations corresponding to a previous time value. Then, the computer predicts cloud coverage for the future sun location based on the propagated sun pixel locations and the segmented cloud model.

14 Claims, 7 Drawing Sheets

(56) References Cited

U.S. PATENT DOCUMENTS

| | | | |
|---|---|---|---|
| 2013/0152997 A1* | 6/2013 | Yao | G01W 1/10 |
| | | | 136/246 |
| 2013/0258068 A1* | 10/2013 | Schmidt | H04N 7/18 |
| | | | 348/49 |
| 2014/0083413 A1* | 3/2014 | Bibi | G01W 1/02 |
| | | | 126/601 |
| 2014/0195159 A1* | 7/2014 | Mewes | G01W 1/02 |
| | | | 702/3 |
| 2015/0247953 A1* | 9/2015 | O'Brien | F03D 17/00 |
| | | | 702/3 |

OTHER PUBLICATIONS

PCT International Search Report dated Jun. 18, 2015 corresponding to PCT International Application No. PCT/US2015/025024 filed Apr. 9, 2015(11 pages).

Ricardo Marquez et al: "Short Term DNI Forecasting With Sky Imaging Techniques", Oct. 1, 2012 (Oct. 1, 2012), pp. 934-941, XP55194761, Denver, Co ISBN: 978-1-62-276092-3.

\* cited by examiner

SHORT TERM CLOUD COVERAGE PREDICTION USING GROUND-BASED ALL SKY IMAGING

TECHNICAL FIELD

The present invention relates generally to methods, systems, and apparatuses for predicting cloud coverage using a ground-based all sky imaging camera. The disclosed methods, systems, and apparatuses may be applied to, for example, provide short predictions of the output of the solar energy based systems.

BACKGROUND

The integration of solar energy in the energy supply reduces the cost of generating power from other resources but introduces its own challenges and costs. The challenges are mainly due to the variation of solar energy. The main factor impacting in the variable solar energy is the sky condition. In order to predict the output of the solar energy based system, it is, therefore, necessary to understand the sky conditions within temporal range.

Clouds are one of the key elements in the sky which cause the variation in the solar energy. The direct and non-direct solar irradiance largely depends on the cloud coverage. For example, when the sun is significantly covered by clouds, the solar radiance falling directly in the power grid decreases whereas when the sun is clear, there is a near constant energy received at the power location.

To predict future cloud coverage, the future locations of both clouds and the sun must be determined. The latter is readily available, for example, from sources such as an astronomical almanac. Similarly, the current state of the sky with respect to clouds is observable, for example, using visual imaging. Thus, it is desired to combine the available information on future sun position and the current state of the sky to provide an accurate prediction of direct and indirect solar irradiance.

SUMMARY

Embodiments of the present invention address and overcome one or more of the above shortcomings and drawbacks, by methods, systems, and apparatuses for predicting cloud coverage using a ground-based all sky imaging camera. This technology is particularly well-suited for, but by no means limited to, solar energy applications.

According to some embodiments of the present invention, a method for predicting short-term cloud coverage includes a computer calculating an estimated cloud velocity field at a current time value based on sky images. The computer determines a segmented cloud model based on the sky images, a future sun location corresponding to a future time value (e.g., using astronomical almanac data), and sun pixel locations at the future time value based on the future sun location. Next, the computer applies a back-propagation algorithm to the sun pixel locations using the estimated cloud velocity field to yield propagated sun pixel locations corresponding to a previous time value. Then, the computer predicts cloud coverage for the future sun location based on the propagated sun pixel locations and the segmented cloud model.

The implementation of the back-propagation algorithm used in the aforementioned method may vary according to different embodiments of the present invention. In one embodiment, the back-propagation algorithm includes, determining a mean of the estimated cloud velocity field, back-propagating each of the sun pixel locations with the mean of the estimated cloud velocity field, and identifying the propagated sun pixel locations based on the sun pixel locations. A smoothing filter may be applied to the mean of the estimated cloud velocity field prior to back-propagating each of the sun pixel locations. In other embodiments, the back-propagation algorithm includes identifying velocity field components in the estimated cloud velocity field, each respective velocity field component corresponding to a respective sun pixel location. Then, the sun pixel locations are back-propagated based on the velocity field components and the propagated sun pixel locations are identified based on the sun pixel locations. In other embodiments, the back-propagation algorithm includes downsampling the estimated cloud velocity field from an original resolution to a lower resolution, yielding a downsampled cloud velocity field. A smoothing filter is then applied to the downsampled cloud velocity field and the downsampled cloud velocity field is upsampled from the lower resolution to the original resolution, yielding a locally smooth filtered velocity field. Next, velocity field components in the locally smooth filtered velocity field are identified. Each respective velocity field component corresponds to a respective sun pixel location. Then, each of the sun pixel locations are back-propagated based on the velocity field components to yield the propagated sun pixel locations. In other embodiments, the back-propagation algorithm includes randomly sampling, for each of the sun pixel locations, a predetermined number of neighboring velocity field components within a predetermined radius in the estimated cloud velocity field based on the respective sun pixel location. Then each of the sun pixel locations are back-propagated based on its respective predetermined number of neighboring velocity field components to yield the propagated sun pixel locations.

The aforementioned method for predicting short-term cloud coverage may also include additional features and/or refinements, according to different embodiments of the present invention. For example, in one embodiment the segmented cloud model is determined by processing each of the sky images to classify each image pixel in a respective sky image as either cloud or sky based on one or more features of the respective sky image. The one or more features may include, for example and without limitation, color spectrum values, a ratio of red color channels and blue color channels, variance values, and entropy values.

In some embodiments, cloud coverage for the future sun location is predicted by first determining a sun region of the segmented cloud model using the propagated sun pixel locations. Next, a number of cloud pixels within the sun region are identified and a binary cloud cover value equal to a ratio of the number of cloud pixels to a total number of image pixels in the sun region is calculated. In other embodiments, cloud coverage for the future sun location is determined by first determining a set of pixel probability values, with each probability value corresponding to a probability of cloudiness for a respective propagated sun pixel in the propagated sun pixel locations. Next, a number of cloud pixels in the segmented cloud model using the propagated sun pixel locations are identified. Then, a sum of the pixel probability values is determined and used to calculate a cloud cover probability value. In one embodiment, this is equal to a ratio of the sum of the pixel probability values to the number of cloud pixels.

In some embodiments, one or more features of the aforementioned method may be applied in various apparatuses, articles of manufacture and systems. For example, in one embodiment, an article of manufacture for predicting short-term cloud coverage comprises a non-transitory, tangible computer-readable medium holding computer-executable instructions for performing the aforementioned method, with or without the additional features discuss above. In other embodiments, a system for predicting short-term cloud coverage includes a tracking and flow module, a cloud segmentation module, a sun location prediction module. The tracking and flow module is configured to calculate an estimated cloud velocity field at a current time value based on sky images. The cloud segmentation module is configured to determine a segmented cloud model based on the sky images. The sun location prediction module is configured to determine a future sun location corresponding to a future time value. The sun occlusion forecasting module is configured to determine sun pixel locations at the future time value based on the future sun location, apply a back-propagation algorithm to the sun pixel locations using the estimated cloud velocity field to yield propagated sun pixel locations corresponding to a previous time value, and predict cloud coverage for the future sun location based on the propagated sun pixel locations and the segmented cloud model. In some embodiments, the system also includes a horizon-to-horizon outdoor video camera configured to capture the sky images.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses for providing short-term predictions of sun occlusion at a future time based on acquired sky images, cloud velocity measured based on those images, and knowledge of a future sun position. For example, in one embodiment, the overall prediction process works as follows: the estimated cloud velocity at time t0 is determined from the regularized flow algorithm, the sun position in the image at time t0+dt is obtained, where dt is the temporal range that is desired to be predicted. Then, a back-propagation algorithm is used to propagate the sun location to time t0 using the velocity information at time t0. Then, the segmentation module may be used to compute the cloud coverage in the sun region at time t0+dt (ground truth) and time t0 (prediction). The measurement of prediction error is the absolute difference between the estimated sun coverage in sun region and the coverage in the back-propagated sun region. The techniques described herein make a reasonable assumption that the solar irradiance is highly dependent on the cloud coverage and hence a precise prediction of cloud coverage leads to the precise prediction of solar irradiance. With this assumption and simplification, we then predict the occlusion of sun at different temporal ranges. The system includes data acquisition, cloud velocity estimation, sun location back-propagation, cloud segmentation module and prediction module.

Figure 1:
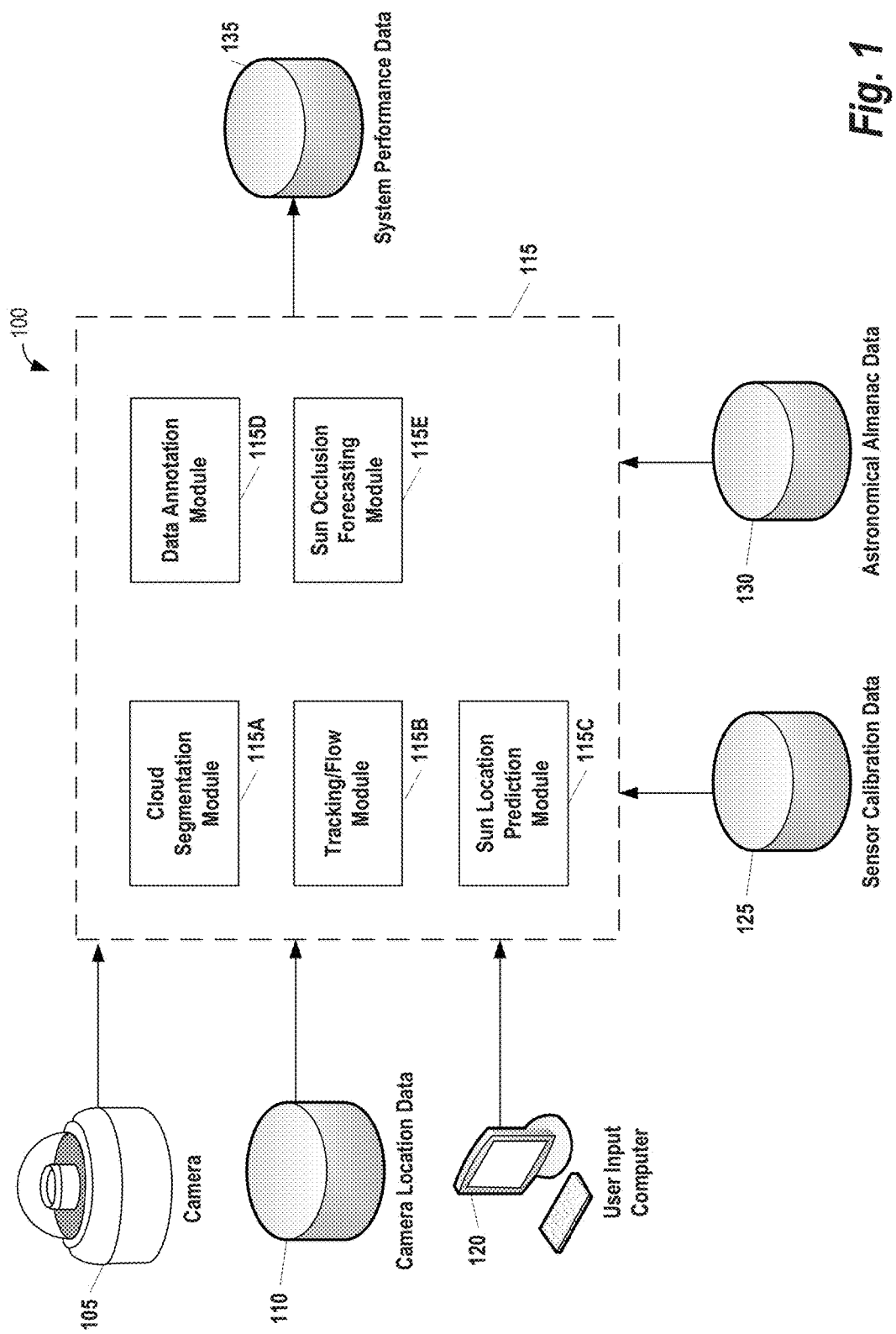
FIG. 1 provides an overview of a system for predicting cloud coverage of a future sun position, according to some embodiments of the present invention.

FIG. 1 provides an overview of a system 100 for predicting cloud coverage of a future sun position, according to some embodiments of the present invention. The system includes a data processing system 115 that receives input from a variety of sources, including a camera 105. The camera 105 may be used to capture sky images at predetermined intervals (e.g., 5 seconds). Prior to use, the camera may be calibrated using specialized software, Camera Location Data 110, and Sensor Calibration Data 125 to yield a camera intrinsic matrix and fisheye camera model. The images captured by the camera 105 may then be projected from image space to sky space. The parameters needed for this projection are available after the calibration of the camera.

The system 100 utilizes a trained cloud segmentation model to identify clouds in image data. To construct the training data utilized by the model, a predetermined number of cloud and sky pixels (e.g., 10,000 of each) are randomly sampled from annotated images. The system 100 includes a User Input Computer 120 which allows users to view sky images and select pixels as "cloud" or a "sky" (i.e., non-cloud). This selection can be performed, for example, by the user selecting individual portions of the image and providing an indication whether the selected portions depict a cloud. The data supplied by the User Input Computer 120 is received and processed by a Data Annotation Module 115D which aggregates the user's annotation data and supplies it to a Cloud Segmentation Module 115A. The Cloud Segmentation Module 115A then constructs a binary classifier which can classify new pixels at runtime as cloud or sky based on the training model.

The features used by the Cloud Segmentation Module 115A to represent sky and cloud pixels can include, for example, color spectrum values and a ratio of red and blue color channels. With respect to color spectrum values, in one embodiment, the Hue (H), Saturation (S) and Value (V) color space is used. It can be observed that sky and cloud pixel values lie in different spectrums in H. Similarly sky pixels have more saturation compared to cloud pixels. V may be used to represent brightness. With respect to the ratio of red and blue color channels, it is understood in the art that the clear sky scatters blue intensities more whereas cloud scatters blue and red intensities equally. Hence, a ratio of blue and red color intensities in the images can be used to distinguish between sky and cloud pixels. In one embodiment, a simple ratio of red (r) and blue channel (b) is used:

$$RBR = \frac{b}{r} \quad (1)$$

In other embodiments, a normalized ratio of red and blue channel is used:

$$RBRn = \frac{b-r}{b+r} \quad (2)$$

In yet another embodiment, a different normalized ratio of channels given by ratio of red channel to the maximum of red and blue channel.

$$RBRn2 = \frac{r}{\max(r,b)} \quad (3)$$

In another embodiment, a difference between the value of red channel and blue channel is employed.

$$RBRdiff=(r-b) \quad (4)$$

The features used by the Cloud Segmentation Module 115A to represent sky and cloud pixels may also include variance values and/or entropy values. Variance provides the measure of spread of the pixels values. In one embodiment, for each pixel in the cloud or sky region, the variance in the N×N neighborhood is computed. For fast computation of variance, integral images for sum image may be used as well as square of intensities image. Entropy provides the textural information about the image. Similar to the variance, for each pixel in the cloud or sky region, the entropy in the N×N neighborhood may be defined as follows:

$$\text{Entropy} = -\sum_{i \in (0,255)} p_i \log(p_i) \quad (5)$$

where $p_i$ is calculated using histogram of image intensities.

Utilizing the cloud velocity, the future sun position may be back-propagated by reversing the velocity components. For example, if the current time is t0 and a prediction of cloud coverage is desired at t0+dt, the sun location at time t0+dt may first be determined. Then, the sun is propagated to t0 based on the velocity calculated at t0. In some embodiments, to simplify processing, the wind speed is assumed to be constant and local cloud evolution is not considered during the prediction period.

Returning to FIG. 1, at runtime, a Sun Location Prediction Module 115C predicts the location of the sun at a future point in time. In the example of FIG. 1, sun location is predicted based on Astronomical Almanac Data 130. However, in other embodiments, different techniques may be used for predicting sun position such as, without limitation, mathematical modeling based on known geophysical constants. The camera 105 captures multiple sky images which are used by a Tracking/Flow Module 115B to calculate a velocity field for the sky. Then, a Sun Occlusion Forecasting Module 115E utilizes the future location of the sun and the velocity field to determine cloud coverage of the future location. More specifically, a group of pixels at the future location of the sun are designated as the "sun pixel locations." Utilizing the velocity field, the Sun Occlusion Forecasting Module 115E backward-propagates the sun pixel location by reversing the velocity components. For example, if the current time is t0 and a prediction of cloud coverage is desired at t0+dt, the sun location at time t0+dt may first be determined. Next, the sun pixels corresponding to that location are propagated to t0 based on the velocity calculated at t0. In some embodiments, to simplify processing, the wind speed is assumed to be constant and local cloud evolution is not considered during the prediction period. Then, the Cloud Segmentation Module 115A uses the aforementioned classifier to determine whether these pixel locations include clouds. If the pixels do include clouds, the future sun location is considered occluded. Following each classification, or on other intervals, system performance data 135 may be outputted which may be used, for example, for system benchmarking.

Figure 2:
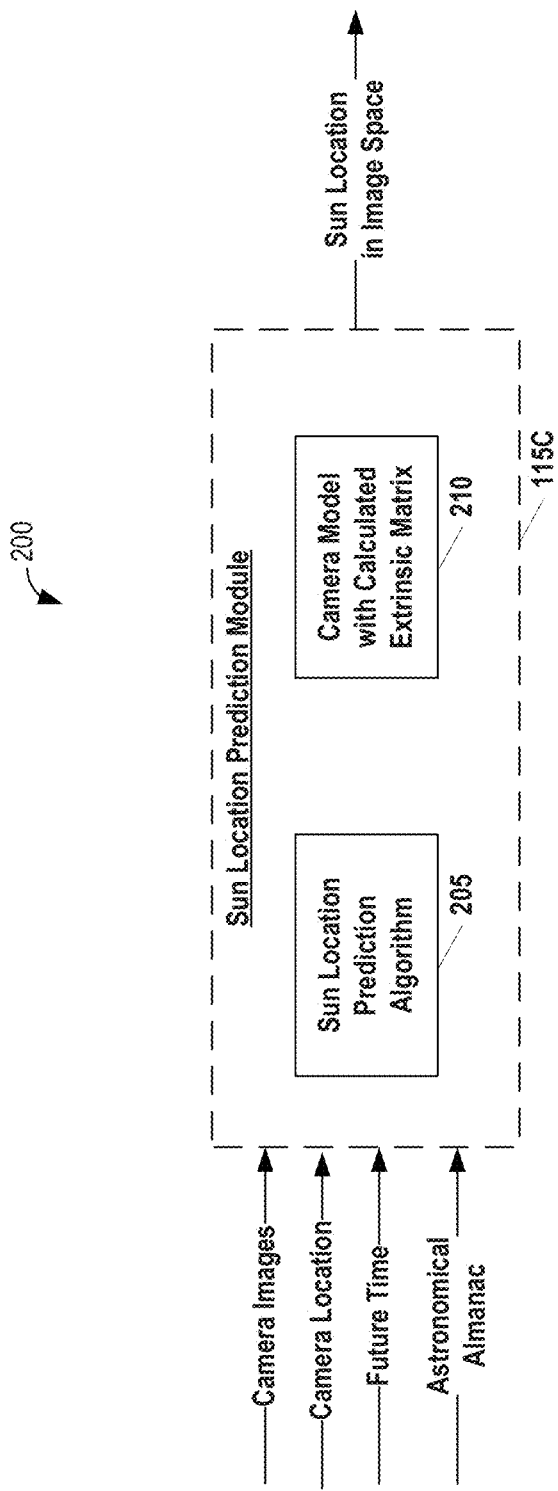
FIG. 2 provides system overview of the processing of the Sun Location Prediction Module, according to some embodiments of the present invention.

FIG. 2 provides system overview 200 of the processing of the Sun Location Prediction Module 115C, according to some embodiments of the present invention. The Sun Location Prediction Module 115C receives the following inputs: one or more camera images, an indication of the geographical location of the camera, a future time value for which a prediction is being sought, and astronomical almanac data. A Sun Location Prediction Algorithm 205 obtains the 3D world sun position from an astronomical almanac data in terms of future time and camera's geographical location. The 3D world sun position may then be used to find corresponding position in the image space by extrinsic projection and the camera model. A Camera Model with a Calculated Extrinsic Matrix 210 is used for mapping the 3D world sun position to image space. In one embodiment, the Calculated Extrinsic Matrix 210 is obtained using 55 annotations from different time points with the re-projection error 2.1+/−1.3 pixels.

Figure 3:
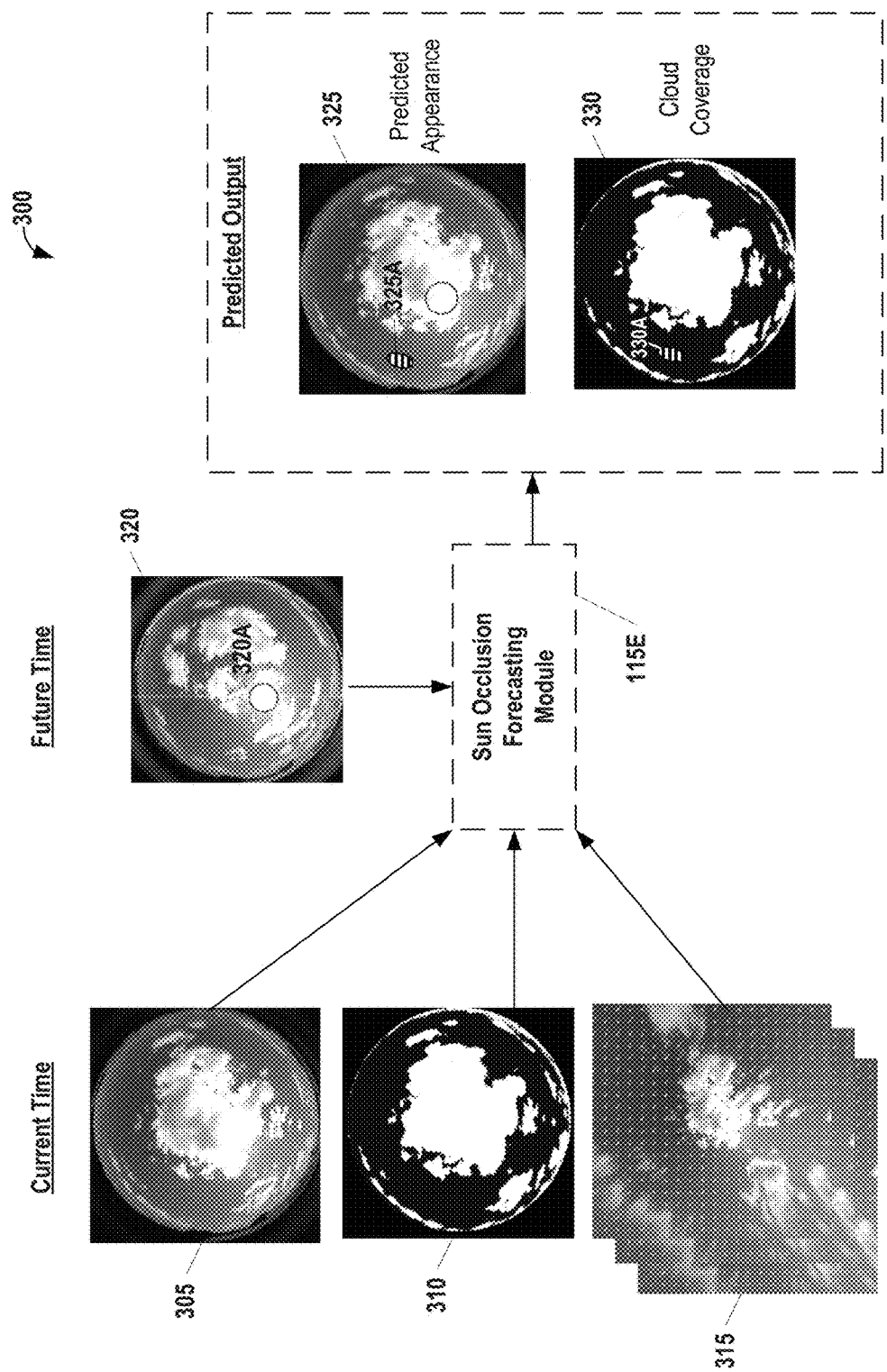
FIG. 3 provides an overview illustration of the prediction system, as used in some embodiments of the present invention.

FIG. 3 provides an overview illustration 300 of the prediction system, as used in some embodiments of the present invention. Predictions of sun occlusion are performed via a Sun Occlusion Forecasting Module 115E. Inputs into the Sun Occlusion Forecasting Module 115E include a sky image at time t0 305, a segmented image 310 showing a binary segmentation of cloud and sky, cloud velocity estimation at time t0 315. Image 320 shows the sky image at a future time, t0+dt. The transparent circle 320A represents the actual sun location at time t0+dt as determined, for example, via Sun Location Prediction Module 115C. Conceptually, the output of the Sun Occlusion Forecasting Module 115E is a prediction of the appearance 325 and a prediction of the cloud coverage shown in image 330. Element 325A is the sun pixel location at t+t0 (shown by transparent circle 320A in image 320) back-propagated using the velocity information 315 at time t0. Image 330 shows the segmented image 310 highlighting the back-propagated sun pixel location 330A.

Figure 4:
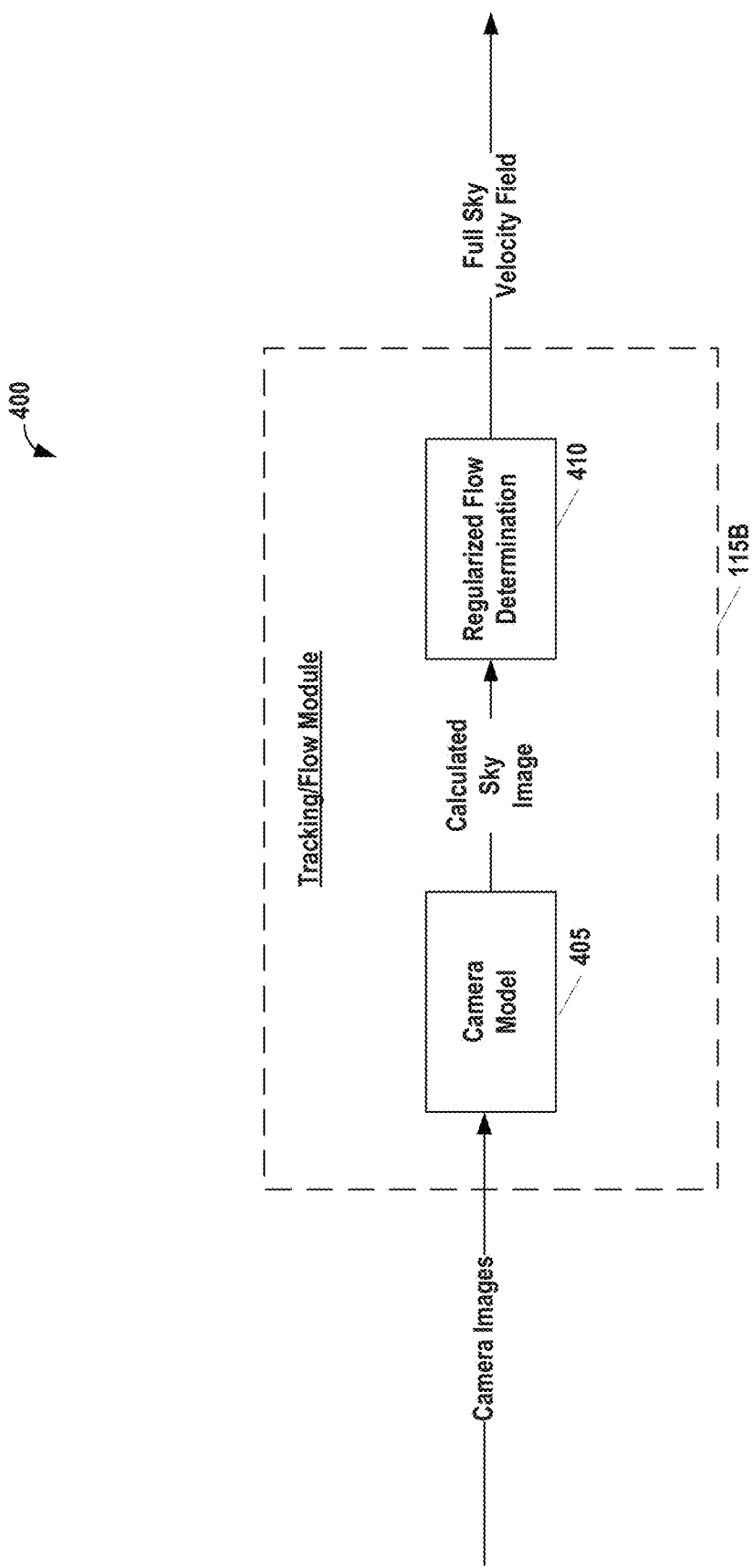
FIG. 4 provides an overview illustration of the Tracking/Flow Module, according to some embodiments of the present invention.

FIG. 4 provides an overview illustration 400 of the Tracking/Flow Module 115B, according to some embodiments of the present invention. A Camera Model 405 receives images captured by the camera 105 which projects these images from image space to sky space. In some embodiments, the Tracking/Flow Module 115B utilizes its own camera model, while in other embodiments it shares a camera model with another module. For example, in one embodiment the Camera Model 405 is the same camera model as shown at 210 in FIG. 2. Cloud velocity is estimated between a pair of images using spatially regularized optical flow algorithm, depicted as the Regularized Flow Determination module 410 in FIG. 4. This results in the output of the velocity field for the full sky.

Figure 5:
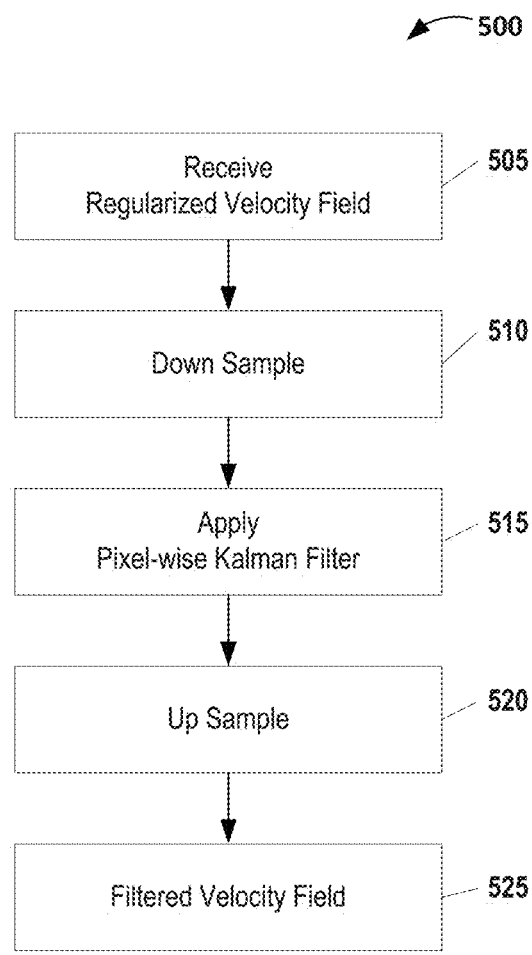
FIG. 5 depicts an example of a process that may be used for generating the filtered velocity field using Kalman filtering, according to some embodiments of the present invention.

The flow observations between a pair of images can be noisy. To stabilize the tracking process and to incorporate temporal information in the current observation, in some embodiments a Kalman filter is employed. FIG. 5 depicts an example of a process 500 that may be used for generating the filtered velocity field using Kalman filtering, according to some embodiments of the present invention. At 505, the regularized, fine grained velocity field at t0 is received. Then, at 510, the field is down sampled by a predetermined factor (e.g., 4). At 515, a Pixel-Wise Kalman Filter is applied on the down sampled velocity field to generate a low resolution filtered velocity field. The Pixel-Wise Kalman Filter resembles a predictor-corrector algorithm. It provides an estimation of the process state at a particular time and then updates the predicted values by incorporating the measurements received at that particular time. In one embodiment, the Pixel-Wise Kalman Filter is set with 2 dynamic parameters and 2 measurement parameters. The dynamic and measurement parameters are the velocity vectors in x and y directions respectively. Returning to FIG. 5, at 520, the low resolution filtered velocity field is up sampled to original resolution. This results in locally smooth filtered velocity field which may then be used at 525 to back-propagate the sun location at time t0+dt.

Various algorithms for back-propagating the sun may be used within the scope of the present invention. For example, algorithms may differ in how they model the observed velocity information and/or how they filter the temporal information. In some embodiments, the back-propagation algorithm utilizes a global mean velocity field. More specifically, this algorithm constitutes the mean of the regularized velocity observed at time t0. Using this algorithm, each pixel in the sun location at time t0+dt is back-propagated with the same mean velocity obtained at time t0. In one embodiment, this algorithm is further modified through the use of a Kalman filter, incorporating additional temporal information from the previous frame pairs to provide smoothing, thus removing the noise in velocity estimation. In other embodiments, the back-propagation algorithm utilizes the full velocity field. This method uses a finer-grained model for the velocity propagation to better capture non-global behavior of the cloud motion. Specifically, the sun location at time t0+dt is propagated with the velocity field at each pixel at time t0. In other embodiments, the back-propagation algorithm utilizes the full velocity field with local and global Kalman filter. This incorporates the global mean velocity as well as fine grained local velocity with Kalman filtering using simple weighted sum model.

An additional variation of the back-propagation algorithm implemented in some embodiments is to utilize the full velocity field with a Monte Carlo approach. The locally filtered velocity provides a temporally and local spatially smooth information for back-propagation of sun location. However, it is sensitive to the noise in the estimation. Hence, the back-propagation may be modeled as a Monte Carlo like perturbation approach. Each pixel is propagated with the velocity of randomly sampled N points from the neighborhood with a radius r. The back-propagation process is the same as full flow back-propagation algorithm either with or without the Kalman filter. This results in N final propagated locations at t0. The predicted cloud coverage is determined by $\Sigma_{i=1}^{N} w_i c_i$, where $c_i$ is the cloud coverage at a propagated location and $w_i$ is a weighting factor. In one embodiment, the weighting factor is set to $w_i=1/N$.

Figure 6:
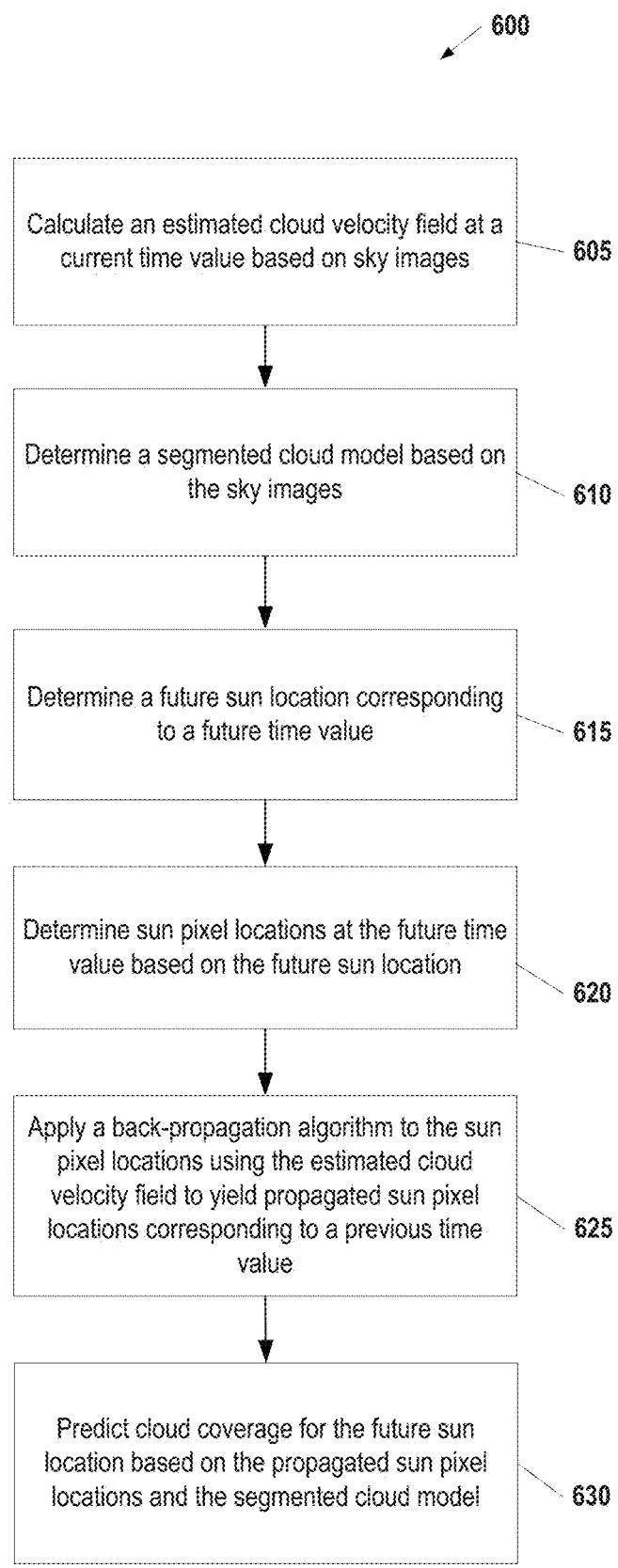
FIG. 6 provides an overview of a process for predicting cloud coverage of a future sun position, according to some embodiments of the present invention.

FIG. 6 provides an overview of a process 600 for predicting cloud coverage of a future sun position, according to some embodiments of the present invention. At 605, an estimated cloud velocity field at a current time value is calculated based on a plurality of sky images. Next, at 610 a segmented cloud model is determined based on the plurality of sky images. Then, at 615, a future sun location corresponding to a future time value is determined.

Continuing with reference to FIG. 6, at 620, sun pixel locations at the future time value are determined based on the future sun location. Next, at 625, a back-propagation algorithm is applied to the sun pixel locations using the estimated cloud velocity field to yield a plurality of propagated sun pixel locations corresponding to a previous time value. Then, at 630, cloud coverage for the future sun location is predicted based on the plurality of propagated sun pixel locations and the segmented cloud model. In some embodiments, the metric of evaluation is the difference in predicted vs. ground truth sun occlusion due to clouds. The following definitions of cloud coverage or the sun occlusion may be used:

$$\text{cloudcover}_{binary} = N_c/N_s \quad (6)$$

where $N_c$ is the number of cloud pixels in the sun region and $N_s$ is the number of total pixels in the sun region, and/or $$\text{cloudcover}_{probability} = P_c/N_s \quad (7)$$

where $P_c = \Sigma_{i \in (1, N_s)} p_i$ and $p_i$ is the probability of cloudiness at pixel i.

Additional refinements may be made to the techniques described in FIG. 6 to compensate for image artifacts that affect system performance. For example, in some sky images, a vertical strip of glare may appear in the center of sun (see, e.g., image 320 in FIG. 3). The vertical strip may result in the underestimation of flow and impacts the cloud segmentation. To mitigate this challenge, in some embodiments, the strip is automatically detected by converting the image into an edge map by running an edge detector and masking the region/strip that has the maximum intensity in the vertical direction. Additionally, due to the brightness of the sun near the circum-solar region, there is a high probability of clear sky being falsely detected as cloud. Adaptive thresholding for classification of cloud to overcome this issue often leads to mis-detection of thicker clouds. To avoid this problem in system evaluation, in some embodiments, the sun is perturbed to an off-sun position assuming a virtual sun in that location. This does not change the geometry and it reduces the variables in evaluation of the back-propagation methods described herein.

Figure 7:
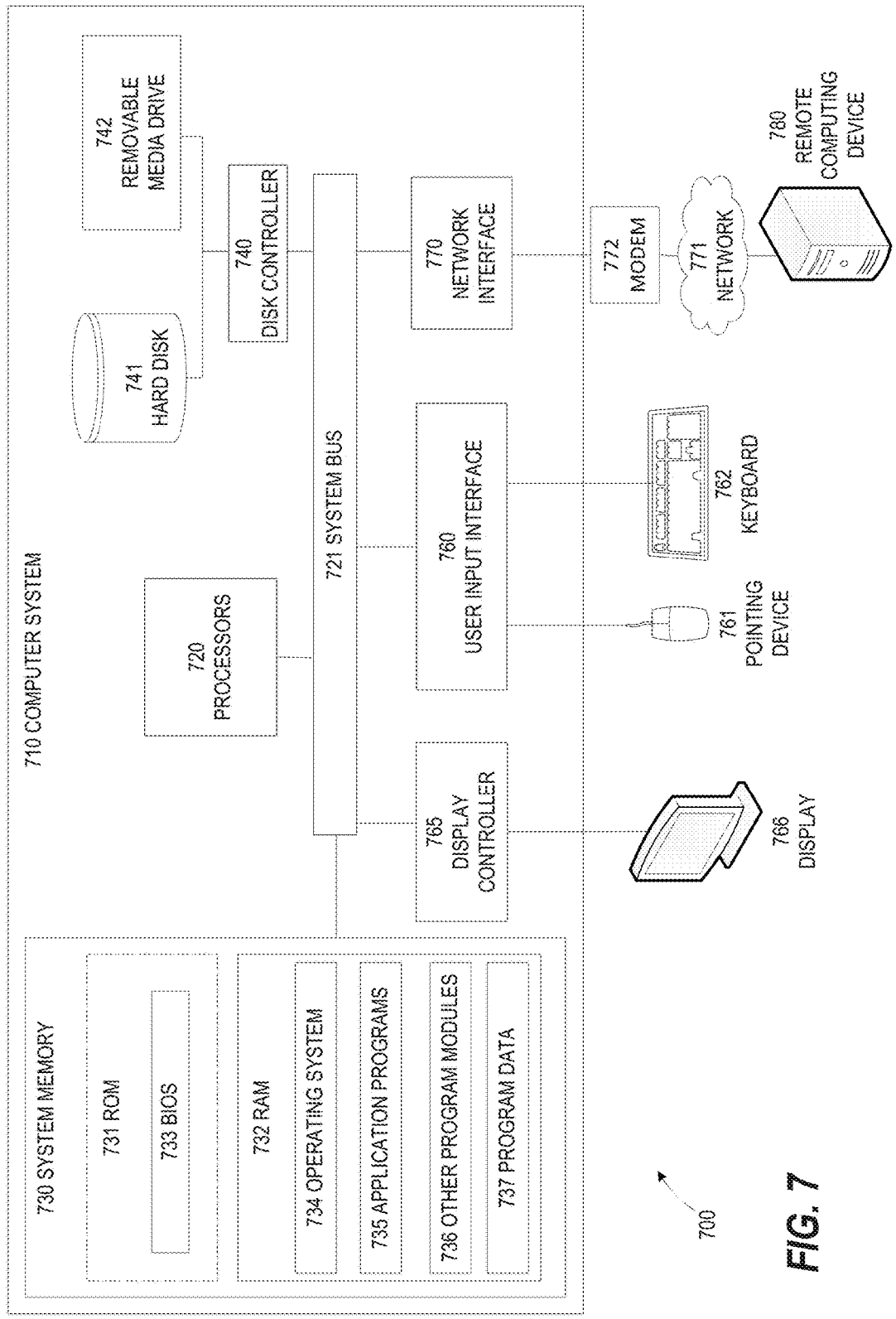
FIG. 7 illustrates an exemplary computing environment within which embodiments of the invention may be implemented.

FIG. 7 illustrates an exemplary computing environment 700 within which embodiments of the invention may be implemented. For example, computing environment 700 may be used to implement one or more components of system 100 shown in FIG. 1. Computers and computing environments, such as computer system 710 and computing environment 700, are known to those of skill in the art and thus are described briefly here.

As shown in FIG. 7, the computer system 710 may include a communication mechanism such as a system bus 721 or other communication mechanism for communicating information within the computer system 710. The computer system 710 further includes one or more processors 720 coupled with the system bus 721 for processing the information.

The processors 720 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 7, the computer system 710 also includes a system memory 730 coupled to the system bus 721 for storing information and instructions to be executed by processors 720. The system memory 730 may include computer readable storage media in the form of volatile and/or nonvolatile memory, such as read only memory (ROM) 731 and/or random access memory (RAM) 732. The RAM 732 may include other dynamic storage device(s) (e.g., dynamic RAM, static RAM, and synchronous DRAM). The ROM 731 may include other static storage device(s) (e.g., programmable ROM, erasable PROM, and electrically erasable PROM). In addition, the system memory 730 may be used for storing temporary variables or other intermediate information during the execution of instructions by the processors 720. A basic input/output system 733 (BIOS) containing the basic routines that help to transfer information between elements within computer system 710, such as during start-up, may be stored in the ROM 731. RAM 732 may contain data and/or program modules that are immediately accessible to and/or presently being operated on by the processors 720. System memory 730 may additionally include, for example, operating system 734, application programs 735, other program modules 736 and program data 737.

The computer system 710 also includes a disk controller 740 coupled to the system bus 721 to control one or more storage devices for storing information and instructions, such as a magnetic hard disk 741 and a removable media drive 742 (e.g., floppy disk drive, compact disc drive, tape drive, and/or solid state drive). Storage devices may be added to the computer system 710 using an appropriate device interface (e.g., a small computer system interface (SCSI), integrated device electronics (IDE), Universal Serial Bus (USB), or FireWire).

The computer system 710 may also include a display controller 765 coupled to the system bus 721 to control a display or monitor 766, such as a cathode ray tube (CRT) or liquid crystal display (LCD), for displaying information to a computer user. The computer system includes an input interface 760 and one or more input devices, such as a keyboard 762 and a pointing device 761, for interacting with a computer user and providing information to the processors 720. The pointing device 761, for example, may be a mouse, a light pen, a trackball, or a pointing stick for communicating direction information and command selections to the processors 720 and for controlling cursor movement on the display 766. The display 766 may provide a touch screen interface which allows input to supplement or replace the communication of direction information and command selections by the pointing device 761.

The computer system 710 may perform a portion or all of the processing steps of embodiments of the invention in response to the processors 720 executing one or more sequences of one or more instructions contained in a memory, such as the system memory 730. Such instructions may be read into the system memory 730 from another computer readable medium, such as a magnetic hard disk 741 or a removable media drive 742. The magnetic hard disk 741 may contain one or more datastores and data files used by embodiments of the present invention. Datastore contents and data files may be encrypted to improve security. The processors 720 may also be employed in a multi-processing arrangement to execute the one or more sequences of instructions contained in system memory 730. In alternative embodiments, hard-wired circuitry may be used in place of or in combination with software instructions. Thus, embodiments are not limited to any specific combination of hardware circuitry and software.

As stated above, the computer system 710 may include at least one computer readable medium or memory for holding instructions programmed according to embodiments of the invention and for containing data structures, tables, records, or other data described herein. The term "computer readable medium" as used herein refers to any medium that participates in providing instructions to the processors 720 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 741 or removable media drive 742. Non-limiting examples of volatile media include dynamic memory, such as system memory 730. Non-limiting examples of transmission media include coaxial cables, copper wire, and fiber optics, including the wires that make up the system bus 721. Transmission media may also take the form of acoustic or light waves, such as those generated during radio wave and infrared data communications.

The computing environment 700 may further include the computer system 710 operating in a networked environment using logical connections to one or more remote computers, such as remote computing device 780. Remote computing device 780 may be a personal computer (laptop or desktop), a mobile device, a server, a router, a network PC, a peer device or other common network node, and typically includes many or all of the elements described above relative to computer system 710. When used in a networking environment, computer system 710 may include modem 772 for establishing communications over a network 771, such as the Internet. Modem 772 may be connected to system bus 721 via user network interface 770, or via another appropriate mechanism.

Network 771 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 710 and other computers (e.g., remote computing device 780). The network 771 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 771.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A method for predicting short-term cloud coverage, the method comprising:
    receiving by a computer, a plurality of sky images captured by a camera aimed at a fixed point in the sky;
    training a segmented cloud model using a plurality of annotated images to produce a binary classifier for classifying each pixel in at least one of the plurality of sky images;
    calculating, by the computer, an estimated cloud velocity field at a current time value based on the plurality of sky images;
    determining, by the computer, a future sun location corresponding to a future time value;
    determining, by the computer, a plurality of sun pixel locations at the future time value based on the future sun location;
    identifying a plurality of velocity field components in the estimated cloud velocity field, each respective velocity field component corresponding to a respective sun pixel location;
    back-propagating each of the plurality of sun pixel locations based on the plurality of velocity field components;
    identifying a plurality of propagated sun pixel locations based on back-propagating of each of the plurality of sun pixel locations;
    predicting, by the computer, cloud coverage for the future sun location based on the identified plurality of propagated sun pixel locations and the trained segmented cloud model, wherein if a propagated sun pixel location is determined by the segmented cloud model to be cloud, the sun at the propagated sun pixel location is considered to be occluded; and
    producing a binary segmented cloud image based on the binary classifier for each pixel, showing the locations of clouds and the propagated sun pixel locations based on the estimated cloud velocity field.

2. The method of claim 1, wherein the back-propagation algorithm comprises:
    downsampling the estimated cloud velocity field from an original resolution to a lower resolution, yielding a downsampled cloud velocity field;
    applying a smoothing filter to the downsampled cloud velocity field;
    upsampling the downsampled cloud velocity field from the lower resolution to the original resolution, yielding a locally smooth filtered velocity field;
    identifying a plurality of velocity field components in the locally smooth filtered velocity field, each respective velocity field component corresponding to a respective sun pixel location; and
    back-propagating each of the plurality of sun pixel locations based on the plurality of velocity field components to yield the plurality of propagated sun pixel locations.

3. The method of claim 1, wherein the back-propagation algorithm comprises:
    for each sun pixel location included in the plurality of sun pixel locations, randomly sampling a predetermined number of neighboring velocity field components within a predetermined radius in the estimated cloud velocity field based on the respective sun pixel location; and
    back-propagating each of the plurality of sun pixel locations based on its respective predetermined number of neighboring velocity field components to yield the plurality of propagated sun pixel locations.

4. The method of claim 1, determining the segmented cloud model based on the plurality of sky images comprises:

for each of the plurality of sky images, classifying each image pixel in a respective sky image as either cloud or sky based on one or more features of the respective sky image,
wherein the one or more features include one or more of color spectrum values, a ratio of red color channels and blue color channels, variance values, and entropy values.

5. The method of claim 1, wherein the future sun location corresponding to the future time value is determined using astronomical almanac data.

6. The method of claim 1, wherein predicting cloud coverage for the future sun location based on the plurality of propagated sun pixel locations and the segmented cloud model comprises:
determining a sun region of the segmented cloud model using the plurality of propagated sun pixel locations;
identifying a number of cloud pixels within the sun region; and
calculating a binary cloud cover value equal to a ratio of the number of cloud pixels to a total number of image pixels in the sun region.

7. The method of claim 1, wherein predicting cloud coverage for the future sun location based on the plurality of propagated sun pixel locations and the segmented cloud model comprises:
determining a plurality of pixel probability values, each probability value corresponding to a probability of cloudiness for a respective propagated sun pixel in the plurality of propagated sun pixel locations;
identifying a number of cloud pixels in the segmented cloud model using the plurality of propagated sun pixel locations;
determining a sum of the plurality of pixel probability values; and
calculating a cloud cover probability value equal to a ratio of the sum of the plurality of pixel probability values to the number of cloud pixels.

8. An article of manufacture for predicting short-term cloud coverage, the article of manufacture comprising a non-transitory, tangible computer-readable medium holding computer-executable instructions for performing a method comprising:
receiving a plurality of sky images from a camera aimed at a fixed point in the sky;
calculating an estimated cloud velocity field at a current time value based on the plurality of sky images;
training a segmented cloud model using a plurality of annotated sky images to produce a binary classifier for classifying each pixel in at least one of the plurality of sky images;
determining a future sun location corresponding to a future time value;
determining a plurality of sun pixel locations at the future time value based on the future sun location;
identifying a plurality of velocity field components in the estimated cloud velocity field, each respective velocity field component corresponding to a respective sun pixel location;
back-propagating each of the plurality of sun pixel locations based on the plurality of velocity field components;
identifying a plurality of propagated sun pixel locations based on each of the plurality of sun pixel locations;
predicting cloud coverage for the future sun location based on the identified plurality of propagated sun pixel locations and the trained segmented cloud model, wherein if a propagated sun pixel location is determined by the segmented cloud model to be cloud, the sun at the propagated sun pixel location is considered to be occluded; and
producing a binary segmented cloud image based on the classifications of each pixel showing the locations of clouds and the propagated sun pixel locations based on the estimated cloud velocity field for the sky.

9. The article of manufacture of claim 8, wherein the back-propagation algorithm comprises:
downsampling the estimated cloud velocity field from an original resolution to a lower resolution, yielding a downsampled cloud velocity field;
applying a smoothing filter to the downsampled cloud velocity field;
upsampling the downsampled cloud velocity field from the lower resolution to the original resolution, yielding a locally smooth filtered velocity field;
identifying a plurality of velocity field components in the locally smooth filtered velocity field, each respective velocity field component corresponding to a respective sun pixel location; and
back-propagating each of the plurality of sun pixel locations based on the plurality of velocity field components to yield the plurality of propagated sun pixel locations.

10. The article of manufacture of claim 8, wherein the back-propagation algorithm comprises:
for each sun pixel location included in the plurality of sun pixel locations, randomly sampling a predetermined number of neighboring velocity field components within a predetermined radius in the estimated cloud velocity field based on the respective sun pixel location; and
back-propagating each of the plurality of sun pixel locations based on its respective predetermined number of neighboring velocity field components to yield the plurality of propagated sun pixel locations.

11. The article of manufacture of claim 8, wherein predicting cloud coverage for the future sun location based on the plurality of propagated sun pixel locations and the segmented cloud model comprises:
determining a sun region of the segmented cloud model using the plurality of propagated sun pixel locations;
identifying a number of cloud pixels within the sun region; and
calculating a binary cloud cover value equal to a ratio of the number of cloud pixels to a total number of image pixels in the sun region.

12. The article of manufacture of claim 8, wherein predicting cloud coverage for the future sun location based on the plurality of propagated sun pixel locations and the segmented cloud model comprises:
determining a plurality of pixel probability values, each probability value corresponding to a probability of cloudiness for a respective propagated sun pixel in the plurality of propagated sun pixel locations;
identifying a number of cloud pixels in the segmented cloud model using the plurality of propagated sun pixel locations;
determining a sum of the plurality of pixel probability values; and
calculating a cloud cover probability value equal to a ratio of the sum of the plurality of pixel probability values to the number of cloud pixels.

13. A system for predicting short-term cloud coverage, the method comprising:

a camera aimed at a fixed point in the sky and configured to capture a plurality of sky images;

a tracking and flow module configured to calculate an estimated cloud velocity field at a current time value based on the plurality of sky images;

a cloud segmentation module configured to train a segmented cloud model using a plurality of annotated sky images to produce a binary classifier for each pixel in at least one of the plurality of sky images;

a sun location prediction module configured to determine a future sun location corresponding to a future time value; and a sun occlusion forecasting module configured to:
  determine a plurality of sun pixel locations at the future time value based on the future sun location;
  identify a plurality of velocity field components in the estimated cloud velocity field, each respective velocity field component corresponding to a respective sun pixel location;
  back-propagate each of the plurality of sun pixel locations based on the plurality of velocity field components;
  identify a plurality of propagated sun pixel locations based on each of the plurality of sun pixel locations;
  predict cloud coverage for the future sun location based on the plurality of propagated sun pixel locations and the segmented cloud model, wherein if a propagated sun pixel location is determined by the segmented cloud model to be cloud, the sun at the propagated sun pixel location is considered to be occluded; and
  produce a binary segmented cloud image based on the binary classifier for each pixel, showing the locations of the clouds and the propagated sun pixel locations based on the estimated cloud velocity field for the sky.

14. The system of claim 13, further comprising:
a horizon-to-horizon outdoor video camera configured to capture the plurality of sky images.

* * * * *